(12) United States Patent
Boo et al.

(10) Patent No.: US 12,739,315 B2
(45) Date of Patent: Sep. 15, 2026

(54) TOE-BASED NETWORK INTERFACE DEVICE, METHOD OF OPERATING THE SAME, AND SERVER DEVICE INCLUDING THE SAME

(71) Applicant: MangoBoost, Inc., Bellevue, WA (US)

(72) Inventors: Junehyuk Boo, Seoul (KR); Jangwoo Kim, Seoul (KR)

(73) Assignee: MangoBoost, Inc., Bellevue, WA (US)

( * ) Notice: Subject to any disclaimer, the term of this patent is extended or adjusted under 35 U.S.C. 154(b) by 671 days.

(21) Appl. No.: 18/120,109

(22) Filed: Mar. 10, 2023

(65) Prior Publication Data

US 2024/0137429 A1 Apr. 25, 2024
US 2024/0236211 A9 Jul. 11, 2024

(30) Foreign Application Priority Data

Oct. 20, 2022 (KR) ........................ 10-2022-0135961

(51) Int. Cl.
*H04L 69/16* (2022.01)
*H04L 47/193* (2022.01)
*H04L 69/165* (2022.01)

(52) U.S. Cl.
CPC .......... *H04L 69/161* (2013.01); *H04L 47/193* (2013.01); *H04L 69/165* (2013.01)

(58) Field of Classification Search
CPC ... H04L 69/161; H04L 47/193; H04L 69/165; H04L 69/12; H04L 69/16
See application file for complete search history.

(56) References Cited

U.S. PATENT DOCUMENTS

2005/0226238 A1* 10/2005 Hoskote .................. H04L 69/12 370/389
2008/0181245 A1* 7/2008 Basso ..................... H04L 47/50 370/412
2012/0131203 A1* 5/2012 Pyatkovskiy ....... H04L 65/1069 709/227
2023/0062889 A1* 3/2023 Wang .................... H04L 49/254

* cited by examiner

*Primary Examiner* — Mandish K Randhawa
(74) *Attorney, Agent, or Firm* — NKL LAW; Jae Youn Kim

(57) ABSTRACT

A TOE-based network interface device, a method of operating the same, and a server device including the same are provided. The network interface device includes an event scheduler configured to generate connection information on a requested event and to perform scheduling on the connection information to output a first control signal, a first TCP controller and a second TCP controller, each configured to receive the connection information from the event scheduler and to control an arithmetic operation on the connection information, and a memory control logic configured to transmit the connection information to a first memory or to store the connection information in a second memory in response to the first control signal.

15 Claims, 10 Drawing Sheets

TOE-BASED NETWORK INTERFACE DEVICE, METHOD OF OPERATING THE SAME, AND SERVER DEVICE INCLUDING THE SAME

CROSS-REFERENCE TO RELATED APPLICATION(S)

This application claims benefit of priority to Korean Patent Application No. 10-2022-0135961, filed on Oct. 20, 2022, in the Korean Intellectual Property Office, the disclosure of which is incorporated herein by reference in its entirety.

BACKGROUND

The present disclosure relates to a network interface, and more particularly, to a TCP/IP offload engine (TOE)-based network interface device, a method of operating the same, and a server device including the same.

Big data or artificial intelligence (AI) has been applied to a wide range of fields, and the use of over-the-top (OTT) services has become commonplace. In this regard, for various devices connected to each other through a network such as a web server, a web application server (WAS), a storage server, or a data server, a required data throughput is rapidly increasing and a required data processing speed is also increasing.

Accordingly, a significantly large amount of system resources may be required when data communication is performed based on a transmission control protocol/Internet protocol (TCP/IP) in a high-speed network environment of several to tens or hundreds of gigabits per second (Gbps) or more. For example, when a web server performs data communication with a user terminal through a network, a significant load may be caused during a TCP/IP arithmetic operation performed by a central processing unit (CPU) of the web server, for example, a host CPU.

In this case, performance of the entire web server may be deteriorated. In addition, processing of network communication performed through the web server may be delayed.

SUMMARY

Example embodiments provide a TOE-based network interface device which may reduce a load of a host CPU and may accelerate data processing in a high-speed network, a method of operating the same, and a server device including the same.

According to an example embodiment, a network interface device includes an event scheduler configured to generate connection information on a requested event and to perform scheduling on the connection information to output a first control signal, a first TCP controller and a second TCP controller, each configured to receive the connection information from the event scheduler and to control an arithmetic operation on the connection information, and a memory control logic configured to transmit the connection information to a first memory or to store the connection information in a second memory in response to the first control signal.

The event scheduler may transmit the connection information to at least one of the first TCP controller, the second TCP controller, and the memory control logic.

The first memory may be included in each of the first TCP controller and the second TCP controller.

The second memory may include a dynamic random access memory (DRAM) disposed outside a first chip in which the first TCP controller and the second TCP controller are provided.

The memory control logic may be provided in a second chip together with the second memory.

The memory control logic may be provided in the same first chip as the first TCP controller and the second TCP controller.

The connection information stored in the first memory may be moved to the second memory when a corresponding event does not occur for a first time.

The memory control logic may generate a second control signal, indicating whether the connection information is moved to the first memory, when an event for the connection information stored in the second memory occurs.

The connection information stored in the second memory may be moved to one of the first memory of the first TCP controller and the first memory of the second TCP controller.

The network interface device may further include a first TCP arithmetic logic and a second TCP arithmetic logic, each configured to perform an arithmetic operation by receiving the connection information, stored in a first memory included in a corresponding one of the first and second TCP controllers, and event information, corresponding to the connection information, from the corresponding TCP controller.

The network interface device may further include a third TCP controller to an n-th TCP controller, each configured to control an arithmetic operation on the connection information and the event information in response to the first control signal, and a first TCP arithmetic logic and an m-th TCP arithmetic logic, each configured to perform an arithmetic operation by receiving the connection information, stored in a first memory of a corresponding one of the third to n-th TCP controllers, and the event information from the corresponding TCP controller.

The n and the m may be different from each other.

The event scheduler may include a mapping table for a storage position of the connection information.

The network interface device may further include a reception processing module configured to parse a data packet, received from a network interface, to output user data of the data packet through a host interface and to transmit metadata of the data packet to the event scheduler as an event and a transmission processing module configured to generate a header corresponding to the connection information in data received through the host interface and to output the header as a data packet.

According to an example embodiment, a method of operating a TCP/IP offload engine (TOE)-based network interface device includes storing connection information corresponding to an event in a first memory of a TCP controller, checking whether the event corresponding to the connection information stored in the first memory occurs, and moving the connection information, stored in the first memory, to a second memory when the event corresponding to the connection information does not occur for a first time. The TCP controller may be provided in plural.

The storing the connection information in the first memory may include selecting one of the plurality of TCP controllers and storing the connection information in a first memory of the selected TCP controller.

The method may further include determining whether to transmit connection information, moved to the second memory, to the first memory when an event corresponding to the connection information, moved to the second memory, occurs, selecting one of the plurality of TCP controllers, and transmitting the connection information, moved to the second memory, to a first memory of the selected TCP controller.

According to an example embodiment, a server device includes a network interface module comprising a TCP/IP hardware stack and a TCP/IP software stack configured to perform a TCP/IP arithmetic operation on a received data packet and a host module configured to receive data of the data packet from the network interface module and to process the received data. The network interface module may store connection information corresponding to the data packet in a first memory of a TCP controller, or may store the connection information corresponding to the data packet in a second memory controlled by a memory control logic.

The network interface module may include the TCP controller provided in plural.

The memory control logic may be provided in the same chip as the second memory.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Hereinafter, exemplary embodiments of the present disclosure will be described in detail with reference to the drawings. The following detailed description is provided to help comprehensive understanding of a method, an apparatus, and/or a system disclosed herein. However, this is merely exemplary, and the present disclosure is not limited thereto.

While describing the present disclosure, when it is determined that a detailed description of a known art related to the present disclosure may unnecessarily obscure the gist of the present disclosure, the detailed description will be omitted. Terms which will be used below are defined in consideration of functionality in the present disclosure, which may vary according to an intention of a user or an operator or a usual practice. Therefore, definitions thereof should be made on the basis of the overall contents of this specification.

Terminology used herein is for the purpose of describing exemplary embodiments of the present disclosure only and is not intended to be limiting. The singular forms are intended to include the plural forms as well, unless the context clearly indicates otherwise. It should be understood that the terms "comprises," "comprising," "includes," and "including," when used herein, specify the presence of stated features, numerals, steps, operations, elements, or combinations thereof, but do not preclude the presence or addition of one or more other features, numerals, steps, operations, elements, or combinations thereof.

Terms, such as "a first" and "a second", may be used to describe various elements, but the elements should not be restricted by the terms. The terms are used to only distinguish one element from the other element. For example, a first element may be named a second element without departing from the scope of rights of the present disclosure. Likewise, a second element may be named a first element. The term "and/or" includes a combination of a plurality of related and illustrated items or any one of a plurality of related and described items.

Below, exemplary embodiments of the present disclosure will be described in detail and to such an extent that a person of ordinary skill in the art will be able to implement the present disclosure without undue experimentation.

Figure 1:
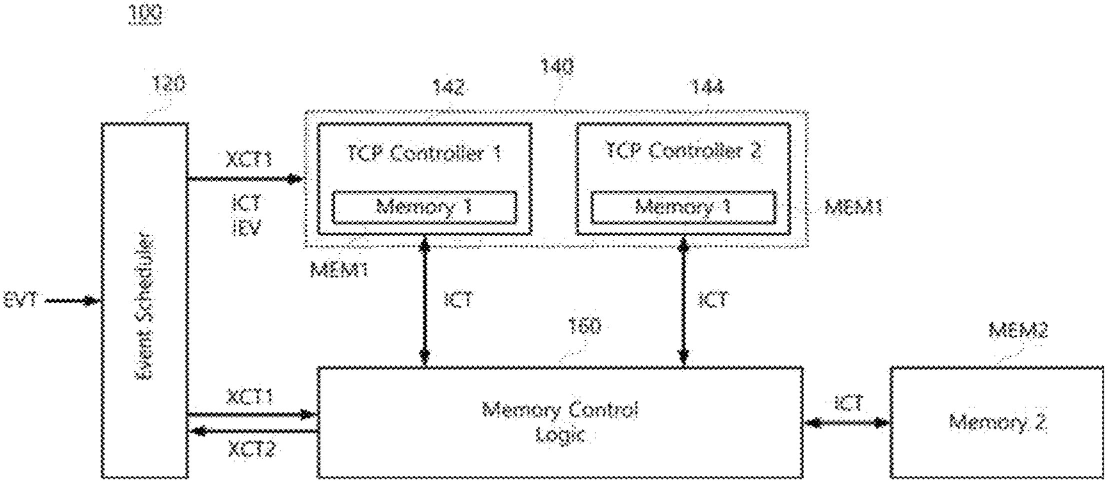
FIG. 1 is a diagram illustrating a network interface device according to an exemplary embodiment of the present disclosure.
Figure 2:
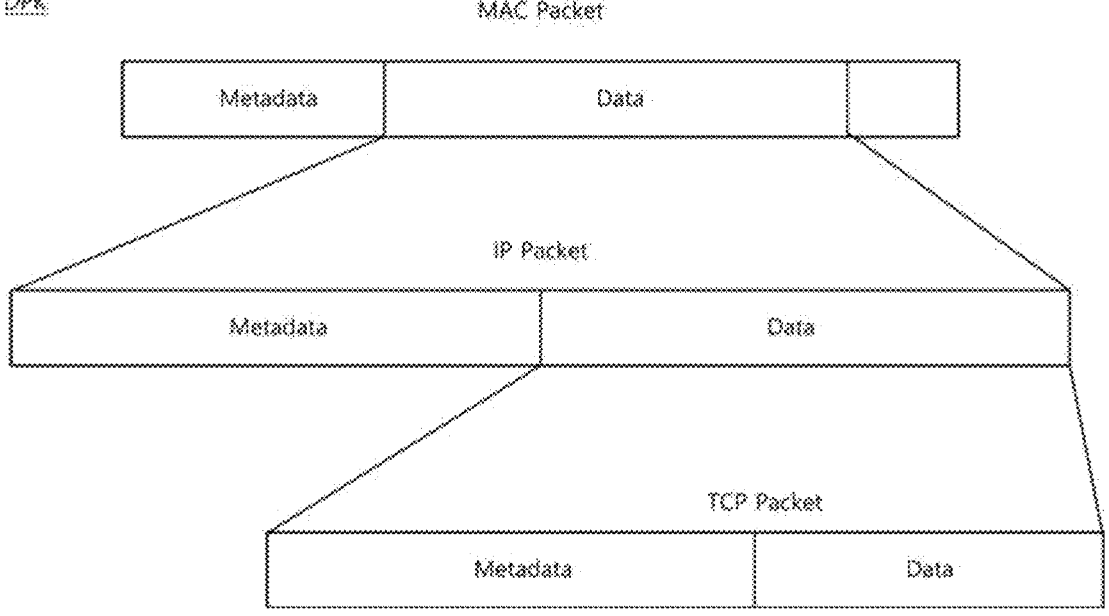
FIG. 2 is a diagram illustrating a data packet processed by a network interface device according to an exemplary embodiment of the present disclosure.

FIG. 1 is a diagram illustrating a network interface device 100 according to an exemplary embodiment, and FIG. 2 is a diagram illustrating a data packet DPK processed by a network interface device according to an exemplary embodiment.

Referring to FIGS. 1 and 2, the network interface device 100 according to an exemplary embodiment may include an event scheduler 120, a TCP controller 140, and a memory control logic 160 to efficiently accelerate data processing in a high-speed network.

The event scheduler 120 may generate connection information ICT on a requested event EVT, and may perform scheduling on the connection information ICT to output a first control signal XCT1. The event EVT may mean that a data packet DPK is received from a network, or a request for data transmission is transmitted from an application. Alternatively, even in the case in which timeout occurs in an operation of the TCP controller 140, or the like, the case may be processed as an event EVT.

The TCP controller 140 may include a first TCP controller 142 and a second TCP controller 144. Each of the first and second TCP controllers 142 and 144 may receive the connection information ICT from the event scheduler 120, and may control an arithmetic operation for the connection information ICT.

The connection information ICT may include information used to set a connection between two end-points of a local node and a remote node to communicate with each other. The connection information ICT may include, for example, items regarding a connection identifier for IP addresses and port numbers of the local node and the remote node. Such connection information ICT may be used to generate or process a header for each layer of a TCP/IP stack. A TCP packet including a TCP header, an IP packet including an IP header, and a MAC packet including a MAC header may be generated for corresponding layers, among layers of the TCP/IP stack. The TCP header of the TCP packet may include metadata such as a source address, a destination address, a sequence number, an acknowledgment number, or the like.

The event scheduler 120 may also generate event information IEV corresponding to the connection information ICT. The event information IEV may be information on the type of event EVT occurring between the local node and the remote node indicated by the connection information ICT. For the above example, the event information IEV may include information on reception of a data packet DPK from the remote node identified with corresponding connection information ICT, a request for data transmission of the local node, or timeout of the event EVT.

Connection information ICT on a pair of local and remote nodes may be transmitted to one of the first and second TCP controllers 142 and 144. For example, connection information ICT on a first pair of local and remote nodes may be transmitted to the first TCP controller 142, and connection information ICT on a second pair of local and remote nodes may be transmitted to the second TCP controller 144. In addition, a plurality of pieces of connection information ICT may be stored in the first TCP controller 142 and the second TCP controller 144. For example, x pieces of connection information ICT may be transmitted to the first TCP controller 142 and y pieces of connection information ICT may be transmitted to the second TCP controller 144. The event information IEV may be transmitted to a TCP controller, to which corresponding connection information ICT is transmitted, among the first and second TCP controllers 142 and 144.

The memory control logic 160 may move the connection information ICT to the first memory MEM1 or store the connection information ICT in the second memory MEM2 in response to a first control signal XCT1. The memory control logic 160 may transmit a second control signal XCT2 to the event scheduler 120, as a result of an operation performed in association with a storage position or scheduling of the connection information ICT.

A first memory MEM1 may be a static random access memory (SRAM). The first memory MEM1 may be included in each of the first TCP controller 142 and the second TCP controller 144. A second memory MEM2 may be a dynamic random access memory (DRAM). However, the types of the first memory MEM1 and the second memory MEM2 are not limited.

When the event information IEV corresponding to the connection information ICT stored in the first memory MEM1 is not updated during a first time, for example, when communication between a remote node and a local node, identified with the connection information ICT stored in the first memory MEM1, is not performed for a predetermined period of time, the connection information ICT stored in the first memory MEM1 may be stored in the second memory MEM2 in response to the first control signal XCT1.

As described above, in the network interface device 100 according to an exemplary embodiment, the first TCP controller 142 and the second TCP controller 144 may independently perform separate operations on the connection information ICT to process an event at high speed. In addition, in the network interface device 100 according to an exemplary embodiment, connection information ICT on connection, in which a standby time of occurrence of an event is maintained for a predetermined period of time or more, may be stored in the second memory MEM2 rather than the first memory MEM1, and thus the first TCP controller 142 or the second TCP controller 144 may control an operation corresponding to new connection information ICT to process an event at high speed.

Figure 3:
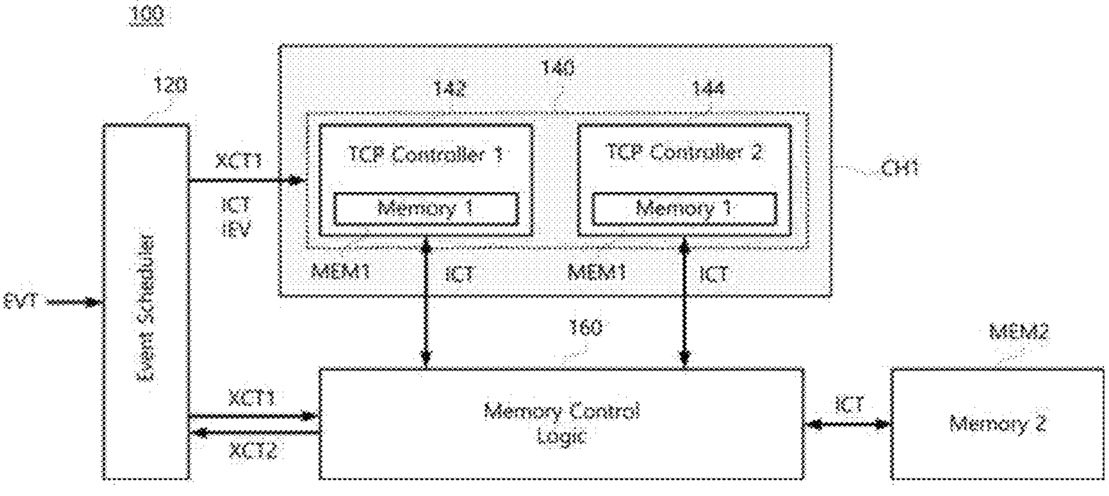
FIGS. 3 to 5 are diagrams, each illustrating a memory control logic according to an exemplary embodiment of the present disclosure.
Figure 4:
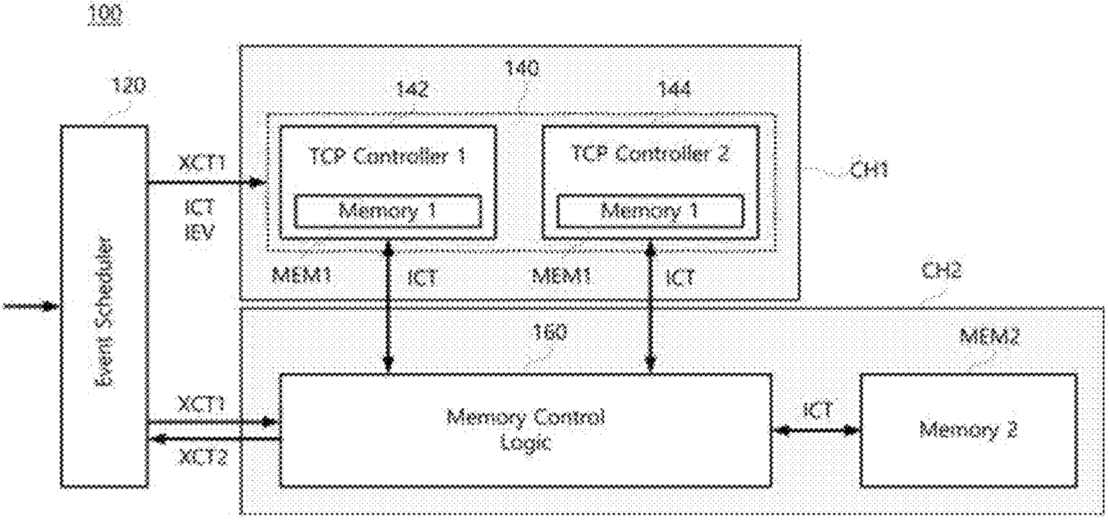
Figure 5:
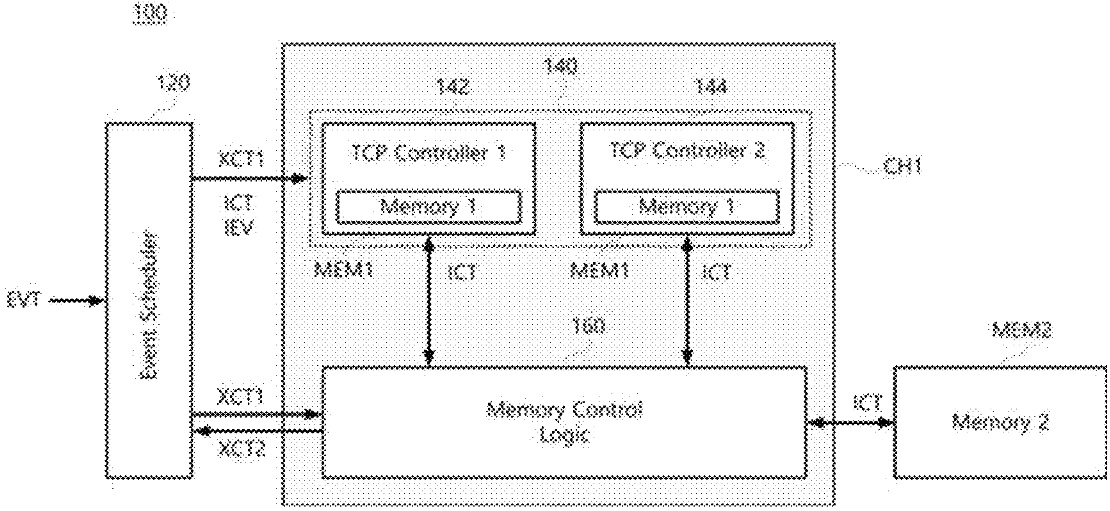

FIGS. 3 to 5 are diagrams, each illustrating a memory control logic 160 according to an exemplary embodiment.

Referring to FIG. 3, a second memory MEM2 according to an exemplary embodiment may be disposed outside a first chip CH1 in which a first TCP controller 142 and a second TCP controller 144 are provided. The second memory MEM2 may include two or more second memories MEM2. In this case, a memory control logic 160 may be provided as a chip, separate from a first chip CH1 and the second memory MEM2. For example, the memory control logic 160 may be provided on a board, on which the first chip CH1 and the second memory MEM2 are mounted, as a field programmable gate array (FPGA) chip, different from the first chip CH1 which is a core chip. Although the event scheduler 120 is illustrated as being disposed outside the first chip CH1, this merely means that the event scheduler 120 may be disposed in various positions and is not meant to exclude the fact that the event scheduler 120 is included in the first chip CH1.

Referring to FIG. 4, a memory controller 160 according to an exemplary embodiment may be provided together with a second memory MEM2 as a second chip CH2, separate from a first chip CH1. For example, the second chip CH2 may be provided as a data process unit (DPU) chip. The first chip CH1 and the second chip CH2 may transmit and receive information and signals through a coherent interconnect. The first chip CH1 and the memory control logic 160 of FIG. 3 may also transmit and receive information and signals through the coherent interconnect.

Alternatively, as illustrated in FIG. 5, a memory control logic 160 may be provided in a first chip CH1 in which a first TCP controller 142 and a second TCP controller 144 are included. In this case, the memory control logic 160 may transmit and receive information and signals to and from a second memory MEM2 through a coherent interconnect.

As described above, the connection information ICT may be stored in one of the first memory MEM1 and the second memory MEM2, based on a state of the connection information ICT. In this case, the memory control logic 160 according to an exemplary embodiment may perform decision making on whether to transmit the connection information ICT, stored in the second memory MEM2, to the first memory MEM1. The operation of the memory control logic 160 will be described later in more detail.

As described above, in the network interface device 100 according to an exemplary embodiment, a storage position of the connection information ICT may be optimized by the memory control logic 160 to improve data processing performance. Furthermore, the network interface device 100 according to an exemplary embodiment may be provided with the memory control logic 160 to be optimized for required resource limit and performance criterion, and thus may perform an operation optimized in a high-speed network environment.

Figure 6:
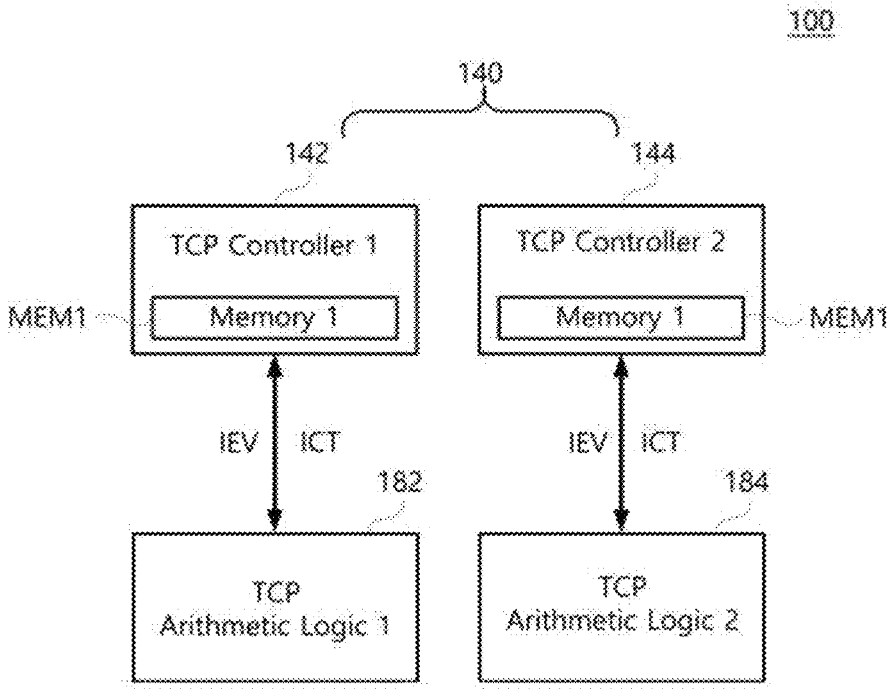
FIGS. 6 and 7 are diagrams, each illustrating a TCP/IP offload engine (TOE)-based network interface device according to an exemplary embodiment of the present disclosure.
Figure 7:
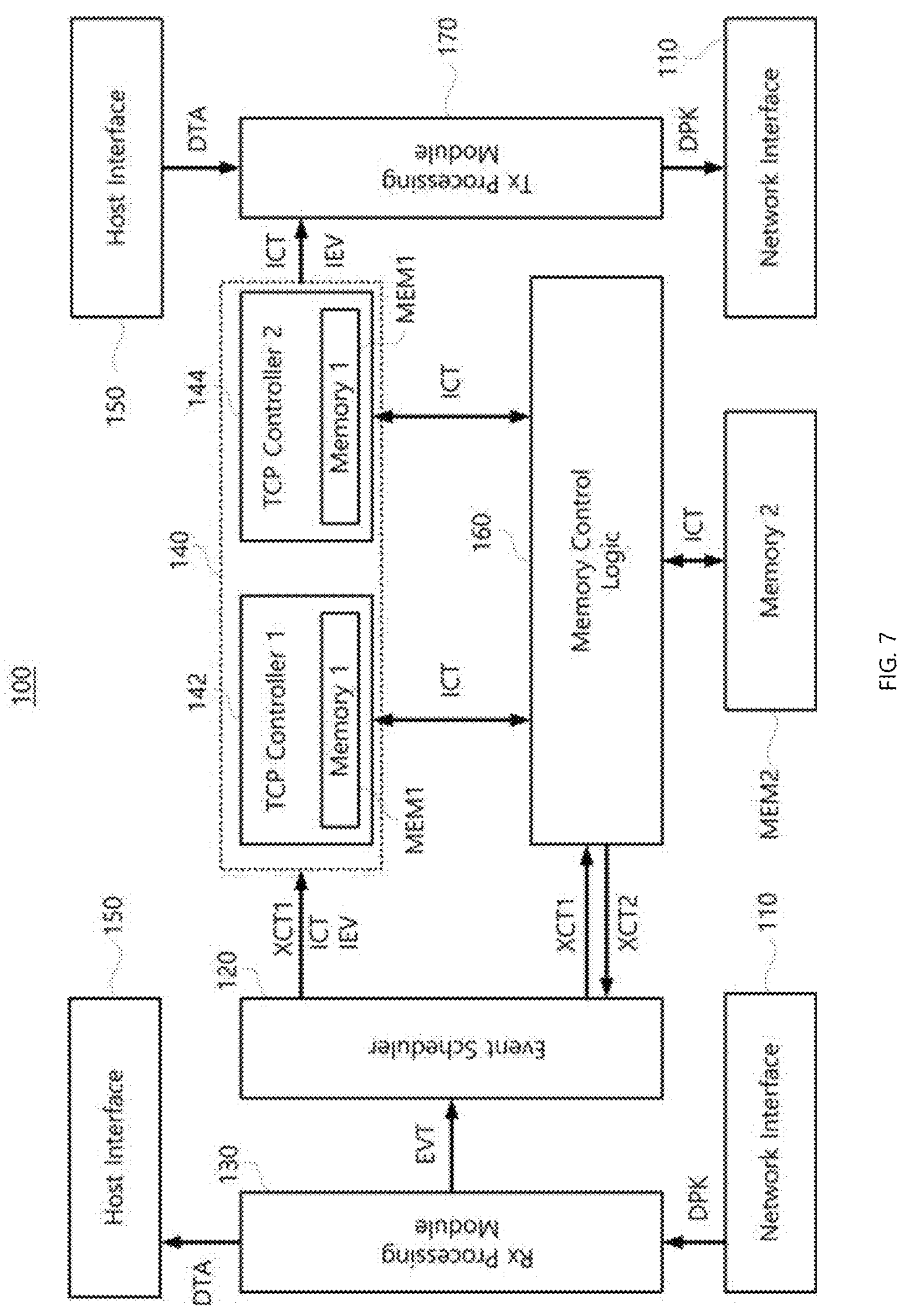

FIGS. 6 and 7 are diagrams, each illustrating a TCP/IP offload engine (TOE)-based network interface device 100 according to an exemplary embodiment.

Referring to FIG. 6, a network interface device 100 according to an exemplary embodiment may be a network interface controller (NIC), a network adapter, or a smart NIC to internally perform processing of Internet standard protocol TCP/IP. For example, the network interface device 100 according to an exemplary embodiment may be a network interface device based on a TOE protocol. The TOE protocol is a type of network acceleration technology in which a TCP/IP arithmetic operation is performed by the network interface device 100, rather than an operating system of a host CPU, to reduce a load of a server device and to increase a data processing speed. The network interface device 100 according to an exemplary embodiment may be provided based on the TOE protocol to support a high-speed network environment.

To this end, the network interface device 100 according to an exemplary embodiment may further includes a first TCP arithmetic logic 182 and a second TCP arithmetic logic 184, together with a first TCP controller 142 and a second TCP controller 144. Each of the first TCP arithmetic logic 182 and the second TCP arithmetic logic 184 may receive connection information ICT and event information IEV, stored in a first memory MEM1, from a corresponding one of the first and second TCP controllers 142 and 144 to perform a TCP/IP arithmetic operation.

For example, the first TCP arithmetic logic 182 and the second TCP arithmetic logic 184 may perform operations required to process a header of each layer, such as congestion window control, flow control, and retransmission, on the received connection information ICT and event information IEV. The first TCP arithmetic logic 182 and the second TCP arithmetic logic 184 may transmit a result, obtained by performing the arithmetic operation, to the first TCP controller 142 and the second TCP controller 144.

Referring to FIGS. 2 and 7, the network interface device 100 according to an exemplary embodiment may also further include a network interface 110, a reception processing module 130, a host interface 150, and a transmission processing module 170.

The network interface 110 may include a gigabit Ethernet controller to provide interfacing with a gigabit Ethernet MAC/PHY chip to process transmission and reception of Ethernet packets. The reception processing module 130 may parse a data packet DPK, received through the network interface 110, into user data and meta data. The user data of the data packet DPK may be transmitted to a host module through the host interface 150. The host interface 150 may include, for example, a peripheral component interconnect express (PCIe) controller to provide interfacing with the host module.

The reception processing module 130 may transmit metadata of the data packet DPK to the event scheduler 120. The event scheduler 120 may process the metadata, received from the reception processing module 130, as an event EVT. When the metadata transmitted from the reception processing module 130 indicates new connection information ICT, the event scheduler 120 may generate the new connection information ICT. When the metadata transmitted from the reception processing module 130 is associated with the connection information ICT stored in the first memory MEM1 or the second memory MEM2, the event scheduler 120 may update the corresponding connection information ICT.

The transmission processing module 170 may output a data packet DPK in response to a data transmission request received through the host interface 150. The data transmission request may be transmitted from an application running in the host module. The data transmission request may be directly transmitted to the host interface 150 without passing through the TCP/IP protocol stack of the host operating system. This may be performed through an application programming interface (API) hooking operation on a socket API such as send( ) and recv( ) of the application.

The transmission processing module 170 may perform an operation to combine a TCP header, an IP header, and a MAC header, corresponding to the data transmission request, with data DTA to be transmitted to a remote node. The TCP header, the IP header, and the MAC header may be generated by the first TCP controller 142 and the first TCP arithmetic logic 182 or the second TCP controller 144 and the second TCP arithmetic logic 184. The data DTA to be transmitted to the remote node may be read from a main memory of the host module.

According to a transmission command of a TCP controller, processing the connection information ICT corresponding to the data transmission request, of the first and second TCP controllers 142 and 144, the data packet DPK may be transmitted from the transmission processing module 170 to the network interface 110 to be output.

Although not illustrated in FIG. 7, the network interface device 100 according to an exemplary embodiment may further include a TCP buffer temporarily storing a data packet DPK to be processed by the reception processing module 130 or a data packet processed by the transmission processing module 170 or temporarily storing user data to be processed by the reception processing module 130 to be output through the host interface 150 or user data, corresponding to the data transmission request, to be received through the host interface 150. An entirety of or a portion of the TCP buffer may be provided as an entirety of or a portion of the second memory MEM2.

As described above, the network interface device 100 according to an exemplary embodiment may operate as illustrated in FIG. 6 or 7 to internally perform a TCP/IP arithmetic operation, resulting in an increased data processing speed. In this case, when the connection information ICT is stored in the second memory MEM2, the above operations may be performed after the connection information ICT is transmitted from the second memory MEM2 to the first memory MEM1. For example, the network interface device 100 may adoptively operate in response to occurrence of an event EVT while allowing connection between more local and remote nodes to be controlled by the first TCP controller 142 and the second TCP controller 144. Accordingly, the network interface device 100 according to an exemplary embodiment may efficiently support high-speed networking.

FIGS. 6 and 7 illustrate an example in which the first TCP arithmetic logic 182 and the second TCP arithmetic logic 184 correspond to the first TCP controller 142 and the second TCP controller 144 in one-to-one correspondence. For example, the first TCP arithmetic logic 182 may process connection information ICT and event information IEV of the first TCP controller 142, and the second TCP arithmetic logic 184 may process connection information ICT and event information IEV of the second TCP controller 144. However, exemplary embodiments are not limited thereto.

Figure 8A:
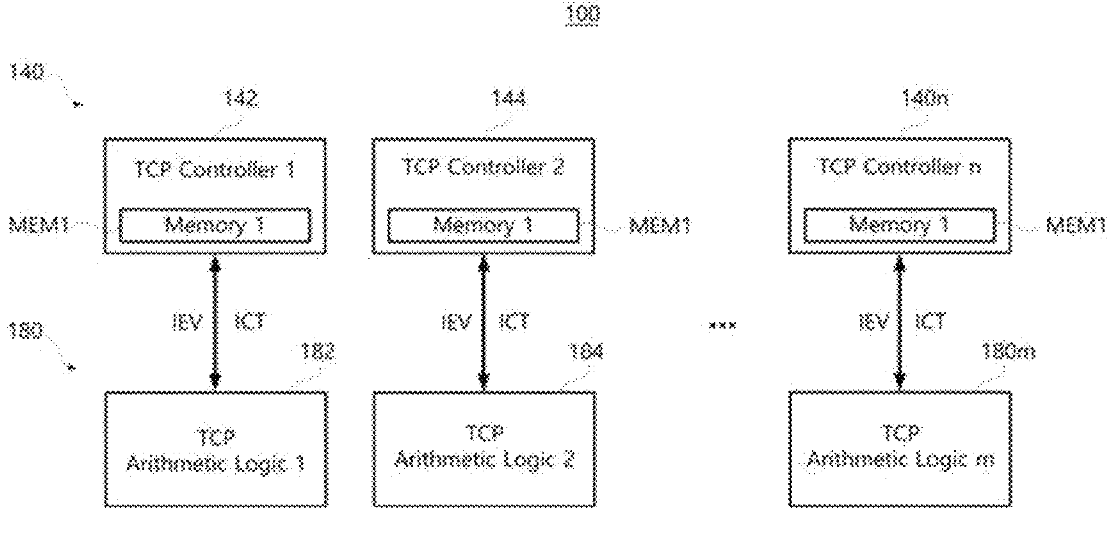
FIGS. 8A to 8C are diagrams, each illustrating a relationship between a TCP controller and a TCP calculation logic according to an exemplary embodiment of the present disclosure.
Figure 8B:
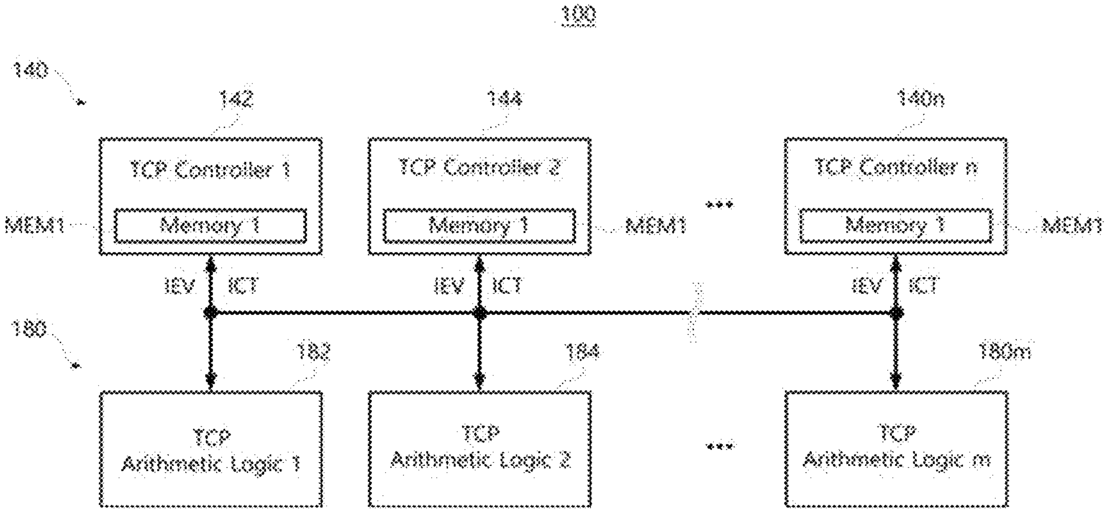
Figure 8C:
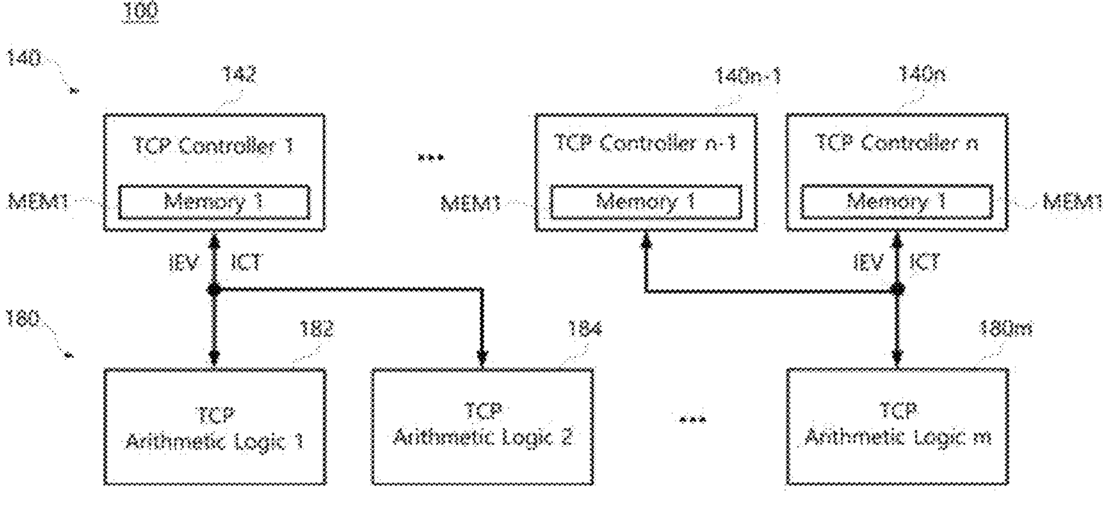

FIGS. 8A to 8C are diagrams, each illustrating a relationship between the TCP controller 140 and the TCP arithmetic logic 180 according to an exemplary embodiment.

Referring first to FIGS. 1 and 8A, the network interface device 100 according to an exemplary embodiment may include n TCP controllers 140 and m TCP arithmetic logics 180. Each of the n TCP controllers 140 may control an arithmetic operation on connection information ICT and event information IEV in response to a first control signal XCT1. Each of the m TCP arithmetic logics 180 may perform a TCP/IP arithmetic operation based on connection information ICT and event information IEV received from a corresponding TCP controller, among the n TCP controllers 140.

The connection information ICT and the event information IEV may be transmitted from the first memory MEM1 to the TCP arithmetic logic 180. When the connection information ICT is stored in the second memory MEM2, the stored connection information ICT may be moved from the second memory MEM2 to the first memory MEM1 in response to a first control signal XCT1 and may then be output to the TCP arithmetic logic 1802.

In this case, n and m may be the same. For example, the TCP controllers 140 and the TCP arithmetic logics 180 may be provided in the same number. In addition, the TCP controller 140 and the TCP arithmetic logic 180 may correspond to each other in one-to-one correspondence. For example, a first TCP arithmetic logic 182 may perform an arithmetic operation under the control of a first TCP controller 142*n*, and an m-th TCP arithmetic logic 180*m* may performs an arithmetic operation under the control of an n-th TCP controller 140*n*. Thus, the network interface device 100 according to an exemplary embodiment may simultaneously perform parallel processing on connections between n remote nodes and m local loads in a state in which other resources are not limited.

Referring to FIGS. 1 and 8B, the network interface device 100 according to an exemplary embodiment may include n TCP controllers 140 and m TCO arithmetic logics 180. Similarly to what is illustrated in FIG. 8A, n and m may be the same. For example, the TCP controllers 140 and the TCP arithmetic logics 180 may be provided in the same number. However, the n TCP controllers 140 of FIG. 8B may share m TCP arithmetic logics 180.

For example, an arithmetic operation may be performed by one of a first TCP arithmetic logic 182 to an m-th TCP arithmetic logic 180*m* under the control of the first TCP controller 142, and an arithmetic operation may be performed by one of the first TCP arithmetic logic 182 to the m-th TCP arithmetic logic 180*m* under the control of the n TCP controller 140*n*. However, exemplary embodiments are not limited thereto. Some of then TCP controllers 140 may share some of the m TCP arithmetic logics 180, and the rest of the n TCP controllers 140 may share the rest of the m TCO arithmetic logics 180.

The network interface device 100 according to an exemplary embodiment may be provided as illustrated in FIG. 8B to simultaneously perform parallel processing on connections between n remote nodes and n local nodes in a state, in which optimal scheduling is performed, and to process a new event EVT through a control logic, on which an arithmetic operation has been completed, among the m TCP arithmetic logics 180. Accordingly, processing performance of the network interface device 100 according to an exemplary embodiment may be improved.

Referring to FIGS. 1 and 8C, the network interface device 100 according to an exemplary embodiment may include n TCP controllers 140 and m TCP arithmetic logic 180. In this case, n and m may be different from each other. For example, the TCP controllers 140 and the TCP arithmetic logics 180 may be provided in different numbers. In this case, at least one of the n TCP controllers 140 may be shared to at least two of the m TCP arithmetic logics 180, or at least two of then TCP controllers 140 may share at least one of the m TCP arithmetic logics 180.

FIG. 8C illustrates an example in which an arithmetic operation is performed by a first TCP arithmetic logic 182 and a second TCP arithmetic logic 184 under the control of the first TCP controller 142 and an arithmetic operation is performed by an m-th TCP arithmetic logic 180*m* under the control of an n-1-th TCP controller 140*n*-1 and an n-th TCP controller 140*n*. Accordingly, the network interface device 100 according to an exemplary embodiment may perform optimized scheduling under limitation of resources to improve processing performance thereof.

In FIGS. 8A to 8C, it has been assumed that the number of the TCP controllers 140 and the number of the TCP arithmetic logics 180 are the same. However, the TCP controllers 140 and the TCP arithmetic logics 180 may be set to have the connection relationship of FIGS. 8A to 8C or other connection relationships, regardless of the sameness of the number of the TCP controllers 140 and the number of the TCP arithmetic logics 180.

Figure 9:
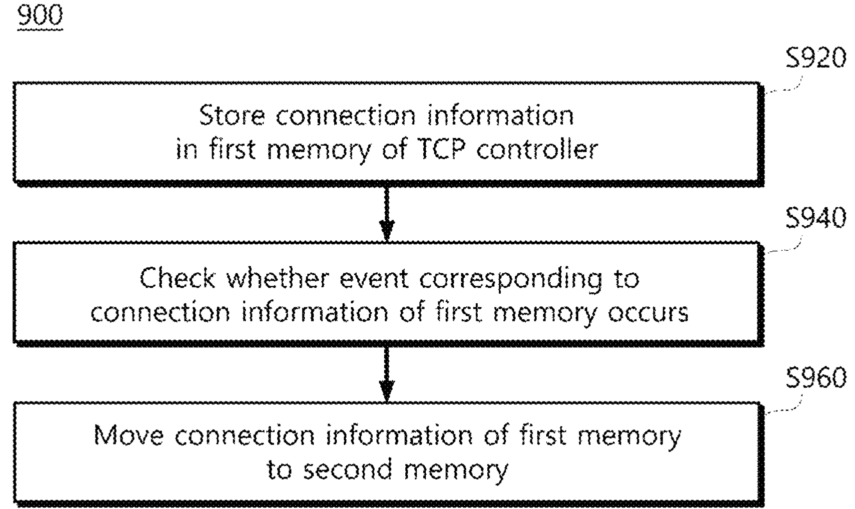
FIG. 9 is a flowchart illustrating a method of operating a network interface device according to an exemplary embodiment of the present disclosure.
Figure 10:
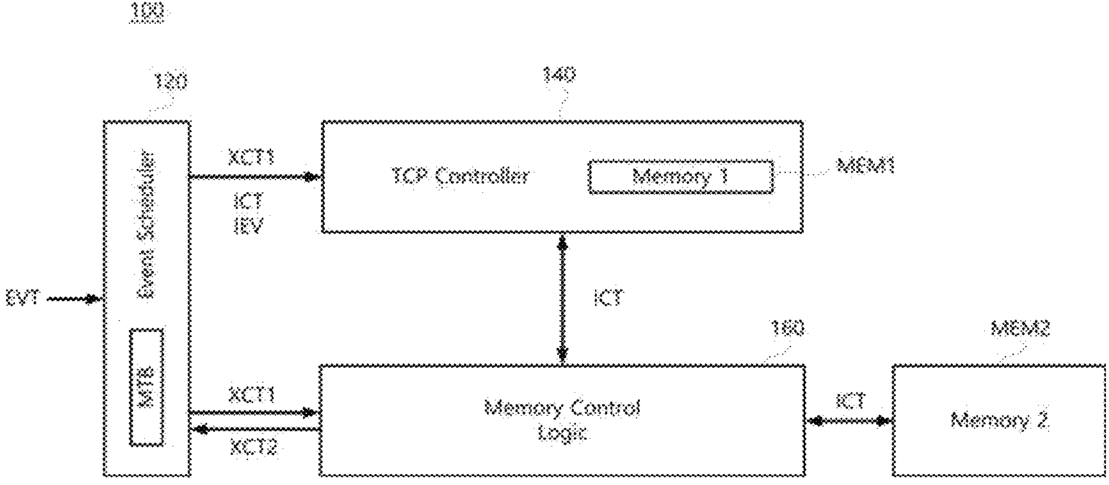
FIG. 10 is a diagram illustrating a network interface device operating based on the method of FIG. 9.

FIG. 9 is a flowchart illustrating a method 900 of operating a network interface device according to an exemplary embodiment, and FIG. 10 is a diagram illustrating a network interface device 100 operating based on the method 900 of FIG. 9.

Referring to FIGS. 9 and 10, the method 900 of operating the network interface device 100 according to an exemplary embodiment may include operation S920 of storing connection information ICT in a first memory MEM1 of a TCP controller 140, operation S940 of checking whether an event EVT corresponding to the connection information ICT stored in the first memory MEM1 occurs, and operation S960 of moving the connection information ICT stored in the first memory MEM1 to a second memory MEM2 when the event EVT corresponding to the connection information ICT does not occur for a first time, thereby accelerating data processing in a high-speed network.

As described above, the connection information ICT may be information generated for the received EVT by the event scheduler 120. The first memory MEM1 may be an SRAM of the TCP controller 140. An operation of writing the connection information ICT in the second memory MEM2 may be performed by the memory control logic 160. The second memory MEM2 may be a DRAM disposed outside a chip in which the TCP controller 140 is provided. The second memory MEM2 may be provided in plural. Among the plurality of second memories MEM2, a memory in which the connection information ICT is to be written by the memory control logic 160 may be selected.

According to the above-described network interface device 100 and the above-described method 900 of operating the same, a limited TCP controller 140 may control connections between more local nodes and more remote nodes to improve performance thereof.

Figure 11A:
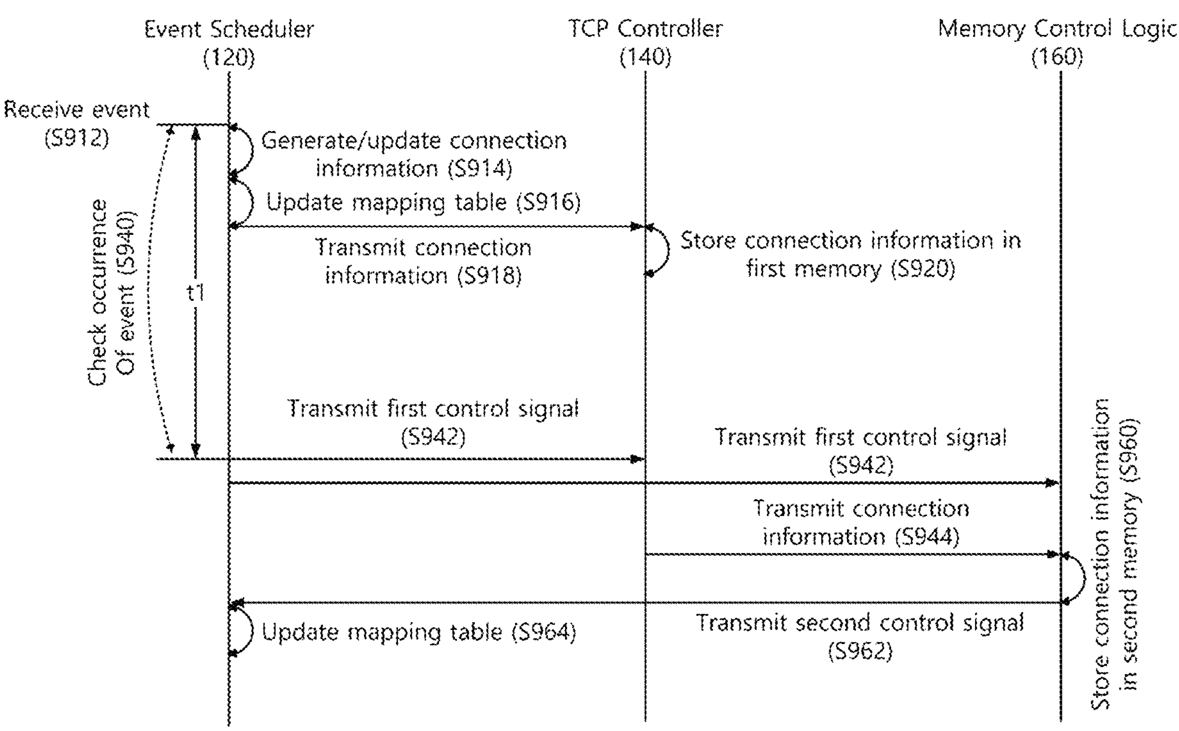
FIGS. 11A and 11B are diagrams, each illustrating the method of operating the network interface device of FIG. 9 in more detail.
Figure 11B:
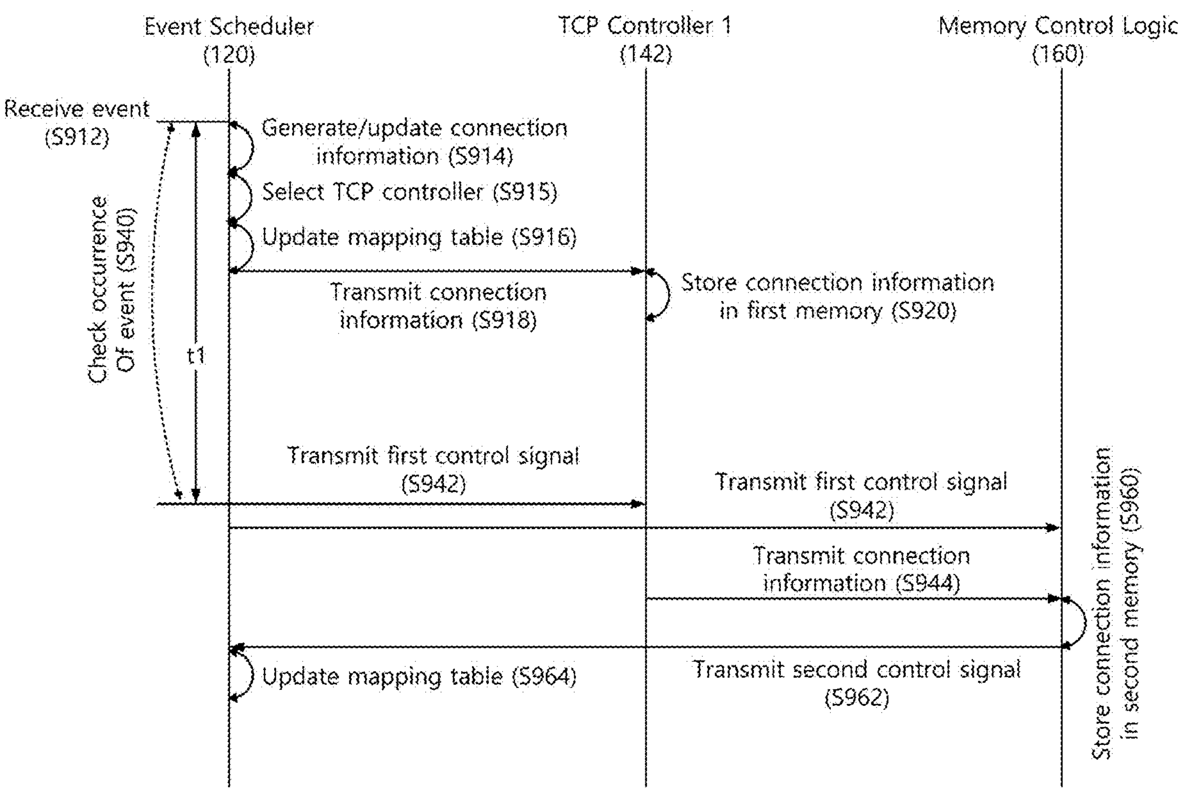

FIGS. 11A and 11B are diagrams, each illustrating the method 900 of operating the network interface device of FIG. 9 in more detail.

Referring to FIGS. 10 and 11A, in the method 900 of operating the network interface device 100 according to an exemplary embodiment, when the event scheduler 120 receives an event EVT (S912), connection information ICT corresponding to the event EVT may be generated or previously generated connection information ICT may be updated (S914). The event scheduler 120 may include a mapping table MTB in which a storage position of the connection information ICT is stored.

When an item regarding newly generated connection information ICT is not present in the mapping table MTB, the event scheduler 120 may update the mapping table MTB (S916) and may transmit the connection information ICT to the TCP controller 140 (S918). The TCP controller 140 may store the connection information ICT in the first memory MEM1 (S920).

The event scheduler 120 may periodically check whether an event EVT corresponding to the connection information ICT occurs (S940). A plurality of events EVT may occur continuously or discontinuously for the connection information, an identifier for connection of a pair of remote and local nodes. When the event EVT corresponding to the connection information ICT does not occur during a first time t1, the event scheduler 120 may transmit a first control signal XCT1 to the TCP controller 140 and the memory control logic 160 controlling an operation associated with the connection information ICT (S942).

The TCP controller 140 may transmit the connection information ICT, stored in the first memory MEM1, to the memory control logic 160 in response to the first control signal XCT1 (S944). The memory control logic 160 may write the connection information ICT, received from the TCP controller 140, in the second memory MEM2 in response to the first control signal XCT1 (S960).

The memory control logic 160 may transmit a second control signal XCT2, indicating that the connection information ICT is stored in the second memory MEM2, to the event scheduler 120 (S962). The event scheduler 120 may update the mapping table MTB in response to the second control signal XCT2 (S964).

Referring to FIGS. 1 and 11B, in the method 900 of operating the network interface device 100 according to an exemplary embodiment, when two or more TCP controllers 142 and 144 are provided, the event scheduler 120 may select which TCP controller receives connection information ICT, among the two or more TCP controllers 142 and 144, before transmitting the connection information ICT (S915). The event scheduler 120 may select a TCP controller based on the number of pieces of connection information ICT controlled by each of the two or more TCP controllers 142 and 144. For example, when the first TCP controller 142 stores two pieces of connection information ICT and the second TCP controller 144 stores five pieces of connection information ICT, the event scheduler 120 may transmit newly generated connection information ICT to the first TCP controller 142 (S918).

Figure 12A:
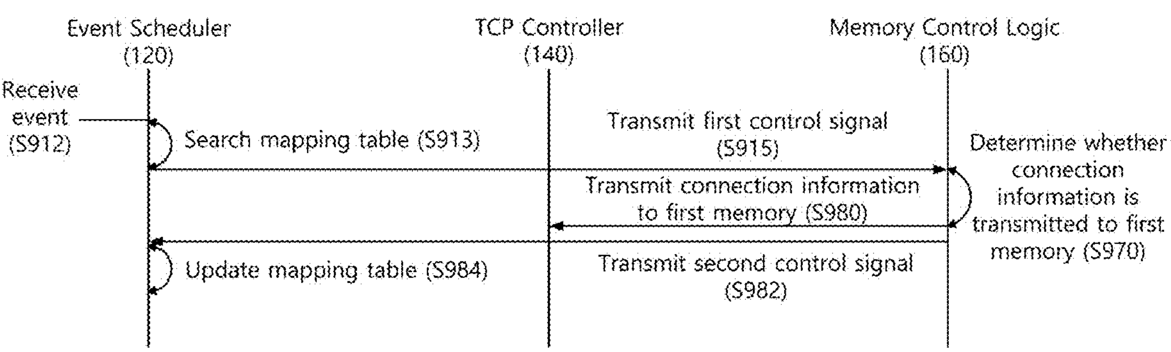
FIGS. 12A and 12B are diagrams, each illustrating an operation of retransmitting connection information to a first memory according to an exemplary embodiment of the present disclosure.
Figure 12B:
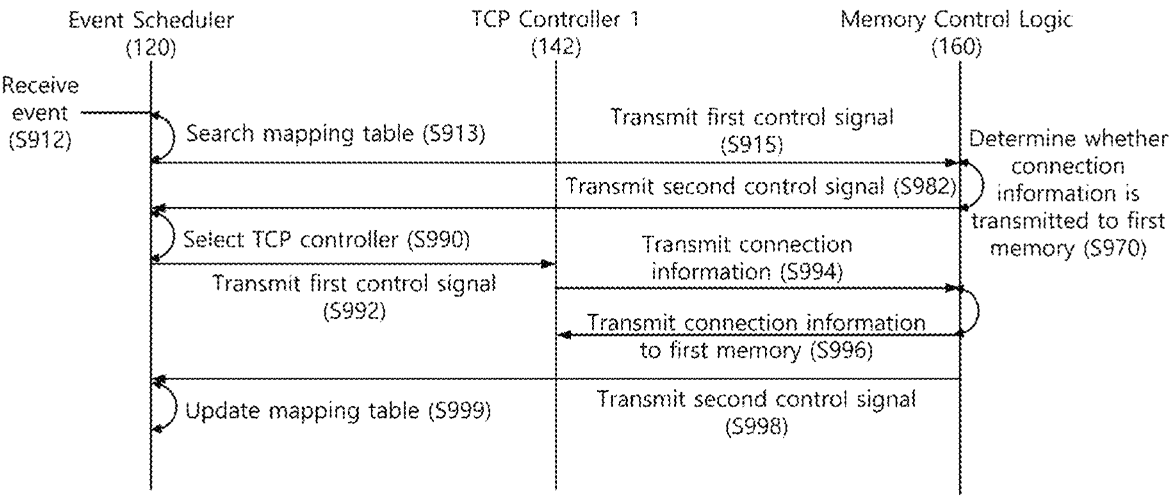

FIGS. 12A and 12B are diagrams, each illustrating an operation of retransmitting connection information ICT to a first memory MEM1 according to an exemplary embodiment.

Referring to FIGS. 10 and 12A, when an event EVT is received by an event scheduler 120 (S912), the event scheduler 120 may search a mapping table MTB (S913). As a result, when the event EVT corresponds to connection information ICT stored in a second memory MEM2, the event scheduler 120 may transmit a first control signal XCT1 to a memory control logic 160 (S915). The first control signal XCT1 of FIG. 12A (and FIG. 12B) may have a value, different from a value of the first control signal XCT1 of FIG. 11A (and FIG. 11B), such as a logic level different from a logic level of the first control signal XCT1 of FIG. 11A (and FIG. 11B).

The memory control logic 160 determines whether to transmit the connection information ICT, stored in the second memory MEM2, to the first memory MEM1 in response to the first control signal XCT1 (S970). For example, when probability that an event EVT for the connection information ICT, stored in the second memory MEM2, occurs within a second time is lower than or equal to a predetermined value, the memory control logic 160 may be maintained in a standby state without transmitting the connection information ICT, stored in the second memory MEM2, to the first memory MEM1. Meanwhile, when probability that an event EVT for the connection information ICT, stored in the second memory MEM2, occurs within a second time is higher than a predetermined value, the memory control logic 160 may move the connection information ICT to the first memory MEM1 (S980).

The memory control logic 160 may transmit a second control signal XCT2, indicating whether the connection information ICT is moved to the first memory MEM1, to the event scheduler 120 (S982). The event scheduler 120 may update the connection information ICT in a mapping table MTB in response to the second control signal XCT2 (S984).

Referring to FIGS. 1 and 12B, in the method 900 of operating the network interface device 100 according to an exemplary embodiment, when two or more TCP controllers 142 and 144 are provided, the event scheduler 120 may determine to which one of first memories of the two or more the TCP controllers 142 and 144 to move connection information ICT stored in a second memory MEM2 again (S990), before transmitting connection information ICT, stored in the second memory MEM2, to the first memory MEM1 (S980).

For example, the memory control logic 160 may transmit a result, obtained by determining (S970) whether to transmit the connection information ICT stored in the second memory MEM2 to the first memory MEM1, to the event scheduler 120 as a second control signal XCT2 (S982). When the second control signal XCT2 indicates that the connection information ICT stored in the second memory MEM2 is transmitted to the first memory MEM1, the event scheduler 120 may search a mapping table MTB of the TCP controllers 142 and 144 to select a TCP controller which may store connection information ICT in the first memory MEM1, for example, the first TCP controller 142 (S990). Hereinafter, it will be assumed that the first TCP controller 142 is selected.

In this case, when the first memory MEM1 of all of the TCP controllers 142 and 144 is unable to store the connection information ICT, the event scheduler 120 may select a TCP controller based on a least recently used (LRU) scheme, or the like. The event scheduler 120 may transmit the first control signal XCT1 to the selected first TCP controller 142 (S992).

The first TCP controller 142 receiving the first control signal XCT1 may transmit one of a plurality of pieces of the connection information ICT, stored in the first memory MEM1, to the second memory MEM2 (S994). The first TCP controller 142 may select the connection information ICT transmitted to the second memory MEM2, among the plurality of pieces of the stored connection information, based on an LRU scheme, or the like.

The memory control logic 160 may transmit the connection information ICT, stored in the second memory MEM2, to the first TCP controller 142 transmitting the connection information ICT stored in the first memory MEM1 (S996). The memory control logic 160 may transmit a second control signal XCT2, indicating that the connection information ICT stored in the second memory MEM2 is stored in the first memory MEM1, to the event scheduler 120 (S998), and the event scheduler 120 may update a mapping table MTB in response to the second control signal XCT2 (S999).

According to the above-described network interface device 100 and the method 900 of operating the same, a storage position of connection information ICT may be optimized through scheduling of the event scheduler 120 and the memory control logic 160 and, at the same time, may efficiently move the connection information ICT again to the first memory MEM1, and thus data processing performance may be improved.

Figure 13:
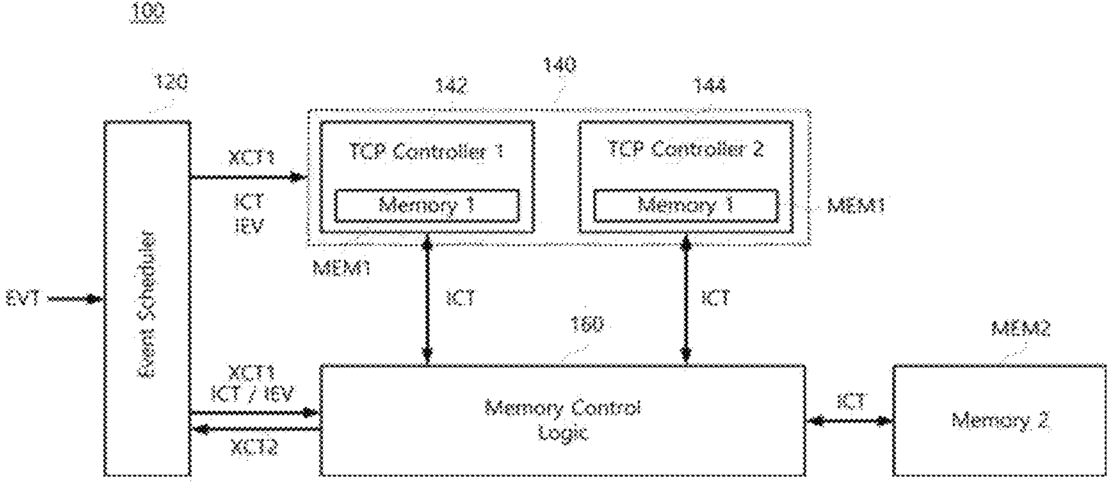
FIG. 13 is a diagram illustrating a network interface device according to an exemplary embodiment of the present disclosure.

FIG. 13 is a diagram illustrating a network interface device 100 according to an exemplary embodiment.

Referring to FIG. 13, unlike the above-described embodiments, in the network interface device 100 according to an exemplary embodiment, an event scheduler 120 may transmit connection information ICT to a memory control logic 160. For example, when a plurality of connection pairs for a remote node and a local node are generated simultaneously or within timings close to each other, the event scheduler 120 may transmit the connection information ICT to the memory control logic 160 such that the connection information ICT is stored first in a second memory MEM2.

In this case, the connection information ICT stored in the second memory MEM2 may be processed based on the operation of FIG. 12A or 12B. According to the above-described network interface device 100, connections may be processed as many as possible based on predetermined resources.

Figure 14:
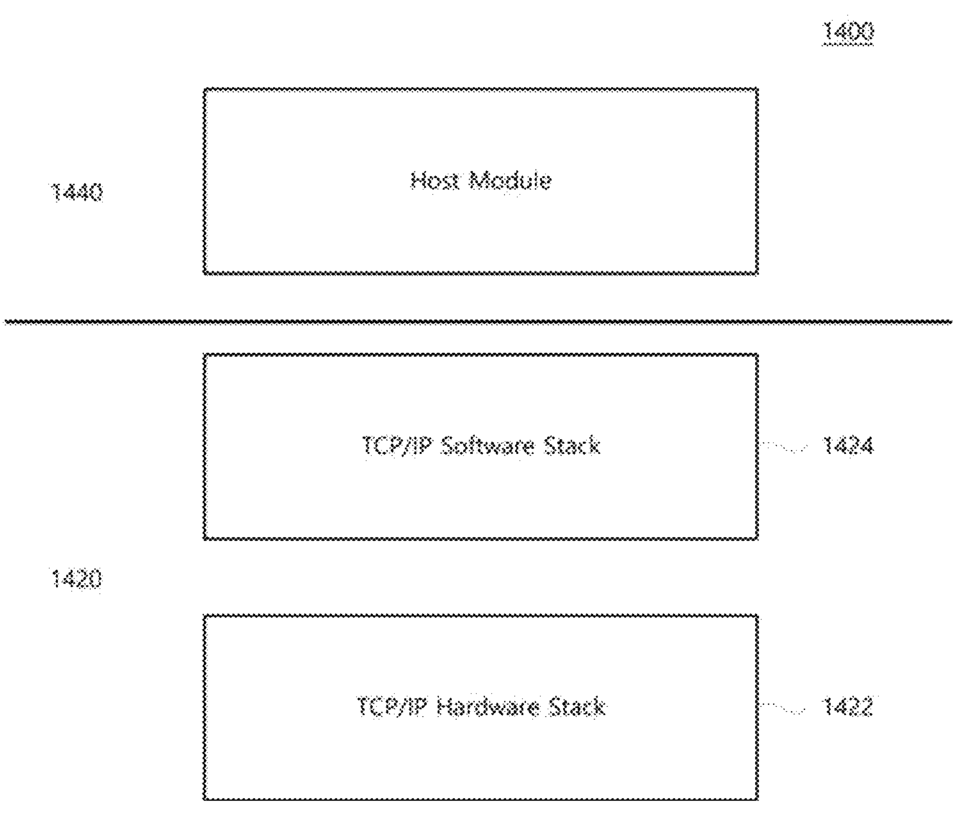
FIG. 14 is a diagram illustrating a server device according to an exemplary embodiment of the present disclosure.

FIG. 14 is a diagram illustrating a server device 400 according to an exemplary embodiment.

Referring to FIG. 14, a server device 1400 according to an exemplary embodiment may include a network interface module 1420 and a host module 1440. The server device 1400 according to an exemplary embodiment may be a type of web server, among various types of web server such as an asynchronous web server, a thread-based web server, a forward proxy, or a reverse proxy-based web server. Alternatively, the server device 1400 according to an exemplary embodiment may be a type of server, among various types of server such as a web application server (WAS), a storage server, or a database server.

The network interface module 1420 may include a TCP/IP hardware stack 1422 and a TCP/IP software stack 1424 performing a TCP/IP arithmetic operation on a data packet DPK. The TCP/IP hardware stack 1422 may include the network interface device 100 of FIG. 1 or FIG. 10

Although not illustrated in FIG. 1, or the like, the TCP/IP software stack 1424 may perform communication between the TCP/IP hardware stack 1422 and the host module 1440 allowing a TCP/IP arithmetic operation to be performed by the network interface module 1420 without passing through a TCP/IP protocol stack of an operating system of the host module 1440, as described in FIG. 7. For example, the TCP/IP software stack 1444 may perform an API hooking operation on a socket API such as send( ) and recv( ) of an application of the host module 1440 when the host module 1440 generates a data transmission request.

Various embodiments for the above-described network interface device 100 may be applied to the network interface module 1420 of FIG. 14. For example, the network interface module 1420 may include two or more ICP controllers 142 and 144, as illustrated in FIG. 1. Alternatively, the network interface module 1420 may be provided as a DPU chip together with a second memory MEM2, as illustrated in FIG. 4.

According to the above-described server device 1400, a load of a CPU of the host module 1440 may be reduced by performing a TCP/IP arithmetic operation in the network interface module 1420, and data processing in a high-speed network may be accelerated by storing connection information on a requested event in one of a first memory MEM1 and a second memory MEM2 and performing optimized scheduling. In addition, the above-described serve device 1400 may include a plurality of TCP controllers to perform processing on a connection pair of remote and local nodes in parallel, and thus data processing performance of the server device 1400 may be improved.

As described above, according to a network interface device according to an exemplary embodiment, a method of operating the same, and a server device including the same, a load of a host CPU may be reduced by performing TCP/IP processing in a network adapter, and data processing in a high-speed network may be accelerated by storing connection information on a requested event in one of a first memory and a second memory and performing optimized scheduling.

Alternatively, according to a network interface device according to an exemplary embodiment, a method of operating the same, and a server device including the same, a load of a host CPU may be reduced by performing TCP/IP processing in a network adapter, and data processing in a high-speed network may be accelerated by processing a requested event, distributed to TCP controllers, in parallel.

Although exemplary embodiments of the present disclosure have been described in detail, it will be understood by those skilled in the art that various changes and modifications may be made without departing from the spirit or scope of the present disclosure. For example, although not described herein, the network interface device 100 and the serve device 1400 according to an exemplary embodiment may further include an additional module supporting another network protocol, such as an internet control message protocol (ICMP) or an address resolution protocol (ARP), other than TCP/IP, and may perform link layer routing, or the like, through the additional module. Therefore, the scope of the present disclosure is not construed as being limited to the described embodiments but is defined by the appended claims as well as equivalents thereto.

What is claimed is:

1. A network interface device comprising:

an event scheduler configured to generate connection information on a requested event, to perform scheduling on the connection information to output a first control signal, and to determine whether a first event corresponding to the connection information occurs during a first time period;

a first TCP controller and a second TCP controller, each of the first and second TCP controllers including a first memory and configured to receive the connection information from the event scheduler, to store the connection information in the first memory, and to control an arithmetic operation on the connection information;

a second memory shared by the first TCP controller and the second TCP controller; and a memory control logic configured to move the connection information from the first memory to the second memory when the first event corresponding to the connection information does not occur during the first time period, and move the connection information, moved to the second memory, from the second memory to one of the first memory of the first TCP controller or the first memory of the second TCP controller when a second event corresponding to the connection information occurs, in response to the first control signal.

2. The network interface device of claim 1, wherein the event scheduler transmits the connection information to at least one of the first TCP controller, the second TCP controller, and the memory control logic.

3. The network interface device of claim 1, wherein the second memory comprises a dynamic random access memory (DRAM) disposed outside a first chip in which the first TCP controller and the second TCP controller are provided.

4. The network interface device of claim 3, wherein the memory control logic is provided in a second chip together with the second memory.

5. The network interface device of claim 1, wherein the memory control logic is provided in the same first chip as the first TCP controller and the second TCP controller.

6. The network interface device of claim 1, wherein the memory control logic generates a second control signal, indicating whether the connection information is moved to the first memory, when the second event for the connection information stored in the second memory occurs.

7. The network interface device of claim 1, further comprising:

a first TCP arithmetic logic and a second TCP arithmetic logic, each configured to perform an arithmetic operation by receiving the connection information, stored in the first memory included in a corresponding one of the first and second TCP controllers, and event information, corresponding to the connection information, from the corresponding TCP controller.

8. The network interface device of claim 7, further comprising:

a third to n-th TCP controllers, each configured to control an arithmetic operation on the connection information and the event information in response to the first control signal; and a first to m-th TCP arithmetic logics, each configured to perform an arithmetic operation by receiving the connection information, stored in the first memory of a corresponding one of the third to n-th TCP controllers, and the event information from the corresponding TCP controller.

9. The network interface device of claim 8, wherein the n and the m are different from each other.

10. The network interface device of claim 1, wherein the event scheduler comprises a mapping table for a storage position of the connection information.

11. The network interface device of claim 1, further comprising:

a reception processing module configured to parse a data packet, received from a network interface, to output user data of the data packet through a host interface and to transmit metadata of the data packet to the event scheduler as an event; and a transmission processing module configured to generate a header corresponding to the connection information in data received through the host interface and to output the header as a data packet.

12. A method of operating a TCP/IP offload engine (TOE)-based network interface device including a plurality of TCP controllers, wherein each of the plurality of TCP controllers includes a first memory, the method comprising:

storing connection information corresponding to a first event in the first memory of a TCP controller among the plurality of TCP controllers;

checking whether the first event corresponding to the connection information stored in the first memory occurs during a first time period;

moving the connection information from the first memory of one of the plurality of TCP controllers to a second memory shared by the plurality of TCP controllers when the first event corresponding to the connection information does not occur for the first time period, selecting one of the plurality of TCP controllers when a second event corresponding to the connection information that is moved to the second memory occurs; and moving the connection information from the second memory to the first memory of the selected one of the plurality of TCP controllers.

13. The method of claim 12, wherein the storing the connection information in the first memory comprises:

selecting one of the plurality of TCP controllers; and storing the connection information in the first memory of the selected TCP controller.

14. A server device comprising:

a network interface module comprising a TCP/IP hardware stack and a TCP/IP software stack configured to perform a TCP/IP arithmetic operation on a received data packet; and a host module configured to receive data of the data packet from the network interface module and to process the received data, wherein the network interface module comprises:

an event scheduler configured to generate connection information corresponding to the data packet on a requested event, to perform scheduling on the connection information to output a first control signal, and to determine whether a first event corresponding to the connection information occurs during a first time period;

a first TCP controller and a second TCP controller, each of the first and second TCP controllers including a first memory and configured to receive the connection information from the event scheduler, to store the connection information in the first memory, and to control an arithmetic operation on the connection information;

a second memory shared by the first TCP controller and the second TCP controller; and a memory control logic configured to move the connection information from the first memory to the second memory when the first event corresponding to the connection information does not occur for the first time period, and move the connection information, moved to the second memory, from the second memory to one of the first memory of the first TCP controller or the first memory of the second TCP controller when a second event corresponding to the connection information occurs, in response to the first control signal.

15. The server device of claim 14, wherein the memory control logic is provided in the same chip as the second memory.

* * * * *